United States Patent [19]

Williams

[11] 4,258,105

[45] Mar. 24, 1981

[54] SEALANT COMPOSITIONS CONTAINING THIOL-TERMINATED POLYESTERS

[75] Inventor: Ralph P. Williams, Bartlesville, Okla.

[73] Assignee: Phillips Petroleum Company, Bartlesville, Okla.

[21] Appl. No.: 43,763

[22] Filed: May 30, 1979

[51] Int. Cl.$^3$ .................................................. C08L 67/00
[52] U.S. Cl. .................................... 428/431; 525/519; 528/274; 528/275; 528/277; 528/281; 528/284; 528/285; 528/293; 260/31.8 XA; 260/40 R; 260/45.7 P; 260/45.7 PH; 260/45.85 S; 260/45.95 F
[58] Field of Search .............. 528/274, 275, 277, 281, 528/284, 293, 285; 525/519; 428/431; 260/31.8 XA, 40 R, 45.95 F, 45.85 S, 45.7 P, 45.7 PH

[56] References Cited

U.S. PATENT DOCUMENTS

| | | | |
|---|---|---|---|
| 3,817,936 | 6/1974 | Jones et al. | 260/76 |
| 3,850,886 | 11/1974 | Doss | 260/76 |
| 4,113,707 | 9/1978 | Louthan et al. | 528/279 |

*Primary Examiner*—Earl A. Nielsen

[57] ABSTRACT

A curing agent package is provided for polymercaptan-terminated polymers comprising selected metal oxides and organonitrogen accelerators and promoters commonly considered as rubber vulcanization accelerators. More specifically, sealant and coating compositions are prepared by curing a mixture comprising a mercaptan-terminated polyether-polyester liquid polymer, a curing agent package of a non-lead metal oxide curing agent and an organonitrogen accelerator or promoter, and, optionally, non-elastomeric materials.

18 Claims, No Drawings

SEALANT COMPOSITIONS CONTAINING THIOL-TERMINATED POLYESTERS

This invention relates to polymercaptan-terminated polymers curable to sealant and coating compositions. In accordance with another aspect, this invention relates to non-lead metal oxide curing agents and organonitrogen accelerators or promoters incorporated into sealant and coating compositions comprising polymercaptan-terminated polymers. In accordance with a further aspect, this invention relates to compositions comprising a poly(oxyalkylene)polyester-poly(monosulfide)-polythiol polymer, at least one non-lead-type metal oxide curing agent and at least one organonitrogen compound accelerator or promoter that are curable to sealant or coating compositions at ambient temperature. In accordance with still another aspect, this invention relates to polymercaptan-terminated polymers, a non-lead-type metal oxide curing agent and an organonitrogen curing agent accelerator in combination with conventionally used non-elastomeric components of sealant and coating formulations that are curable at ambient temperature.

Liquid mercaptan polymers having at least two terminal mercaptan groups can be easily cured to rubbery products having excellent resistance to weathering, oil, ozone, and water. Because of these properties, polymers having at least two terminal mercaptan groups have been widely used as sealants, adhesives and coatings as well as in many other applications.

Metal oxides, particularly lead dioxide, have been common curing agents for the mercaptan-terminated polymers partly because of the ease at which the curing agents react at ambient room temperature, the performance properties of the cured products and the low cost. However, during recent years, environmental demands have greatly limited the use of lead-based materials and may in time completely eliminate all applications involving lead.

Other metal oxides such as those based on manganese, zinc, calcium, iron, nickel, etc., have not, as yet, demonstrated any serious environmental objections and, thus, can be used as substitutes for the lead oxide. Nevertheless, these non-lead metal oxide curing agents do not always provide a cured composition with performance properties equivalent to those obtained with the lead oxide-cured systems. For this reason, there is a need for special additives that can assist, accelerate or promote the cure of liquid mercaptan-terminated polymer-based compositions that employ non-lead type metal oxide curing agents.

Accordingly, an object of this invention is to provide sealants, coatings and caulking compositions based on polymercaptan-terminated polymers curable at ambient conditions.

Another object is to provide more readily curable sealant and curing formulations.

Another object of this invention is to provide sealants and coatings with a desirable balance of physical properties.

In accordance with the invention, sealants and coating compositions having a desirable balance of physical properties are prepared by curing at ambient temperature a mixture comprising a polymercaptan-terminated polymer, at least one non-lead type metal oxide curing agent and at least one organonitrogen curing agent accelerator with the balance optionally being non-elastomeric components including fillers, plasticizers, antioxidants, adhesion promoters and the like.

Broadly, this invention relates to a sealant composition comprised of a mercaptan-terminated polyether-polyester liquid polymer, fillers, plasticizer, thickener, pigments and antioxidant that when treated with a non-lead metal oxide curing agent and an organonitrogen accelerator or promoter form an elastomeric product with good performance properties.

One embodiment of this invention provides a sealant composition comprised of a mercaptan-terminated polyether-polyester liquid polymer, fillers, plasticizer, thickener, pigments and antioxidant.

Another embodiment of the invention provides a method whereby non-lead metal oxides or metal carbonate-oxide mixtures cure said composition to an elastomeric product with good performance properties.

Still another embodiment of the invention provides a method whereby organonitrogen compounds optionally containing sulfur and oxygen atoms can promote or accelerate the curing of said composition with said curing agents.

A final embodiment of the invention provides a method of increasing the adhesive strength to glass of said cured composition by the addition of an organosilane before hardening or curing occurs.

The poly(oxyalkylene)-polyester-poly(monosulfide)-polythiols having an average of more than two mercaptan groups per molecule can be produced by reacting at least one mercaptodialkanoic acid and at least one thiodialkanoic acid with poly(oxyalkylene)-polyols having an average of more than two hydroxy groups per molecule. The mercaptoalkanoic acids, the thiodialkanoic acids, and the poly(oxyalkylene)-polyols that can be used to prepare the poly(oxyalkylene)-polyester-poly(monosulfide)-polythiol polymers are described in detail in U.S. Pat. No. 3,849,381, Doss et al, issued Nov. 19, 1974 and U.S. Pat. No. 3,817,936, Jones et al, issued June 18, 1974. In addition, said patents set forth the ratios of reactants, reaction conditions, and the like.

A now more preferred method of preparation of the mercaptan-terminated polymers of this invention is described in U.S. Pat. No. 4,113,707, Louthan et al, issued Sept. 12, 1978, where at least one alkyl mercaptocarboxylate and at least one dialkyl thiodicarboxylate is treated in the presence of a tetraalkyl titanate transesterification catalyst with a poly(oxyalkylene)-polyol having more than two hydroxy groups per molecule to give a poly(oxyalkylene)-polyester-poly(monosulfide)-polythiol having more than two pendant mercaptan groups per molecule.

Curing agents useful in the present invention are those non-lead metal oxides (i.e., dioxides or peroxides) generally found within Groups II and VII of the Periodic Table, such as for example, calcium peroxide, zinc peroxide, manganese dioxide, cadmium peroxide, strontium peroxide and the like. Compounds such as titanium dioxide are not in a highly active state and are not considered as curing agents within the scope of this invention although they can influence the activity of a curing agent and can be used as a pigment or filler in the sealant recipe described in the present invention. In addition to the metal oxide curing agents of the present invention, some mixtures of metal oxide-metal carbonates can be employed as curing agents and are also within the scope of this invention. Such compounds are, for example, basic zinc carbonate ($ZnCO_3 \cdot 2ZnO$).

To assure a complete and fully cured elastomeric system, that is the optimum cure between the mercaptan-terminated polymer of the present invention and the metal oxide curing agents described herein, it is sometimes necessary to add certain compounds to the formulation generally referred to as accelerators or promoters. These compounds are used to increase the rate of cure, improve the physical properties, and improve the aging of the elastomeric product to which it has been added. Frequently, the composition to which the accelerator or promoter is added cannot adequately cure without the presence of the appropriate accelerator. Accelerators or promoters useful in this invention are known in the art and are frequently referred to as rubber vulcanization accelerators. Not all rubber vulcanization accelerators are necessarily useful in the present invention although many not listed herein may work equally as well as those disclosed. Nevertheless, there are certain types of rubber vulcanization accelerators that are within the scope of the present invention. Broadly these include organonitrogen compounds of which there are three types useful in this invention. The first type are those products derived from an aldehyde and an amine. The principal amine used is aniline, though it is sometimes replaced with toluidine, and, in one or two cases, aliphatic amines such as butylamine and propylamine. The chief aldehydes used as formaldehyde, acetaldehyde, butyraldehyde, and heptaldehyde. Some examples of the aldehyde-amine accelerators useful in the present invention are shown in Table I.

TABLE I

| Aldehyde-Amine Accelerators | | |
|---|---|---|
| Reported Composition | Trade Name | Source |
| 1. Butyraldehyde and butylidene aniline reaction product | A-32 | Monsanto |
| 2. Aldehyde-amine condensation product | Accelerator 30 | Akron Chem. |
| 3. Butyraldehyde-aniline condensation product | Accelerator 808 | Du Pont |
| 4. Butyraldehyde-monobutylamine condensation product | Accelerator 833 | Du Pont |
| 5. Butyraldehyde-aniline reaction product | Beutene | Uniroyal Chem. |
| 6. Aldehyde-amine | Roy-AC 30 | H.M. Royal |
| 7. Heptaldehyde-aniline reaction product | Hepteen Base | Uniroyal Chem. |

In addition to the above-mentioned aldehyde-amine accelerators, there is a second type of organonitrogen compound useful in this invention. These organic compounds are those that contain sulfur and are represented by the formula

[R—(S)$_a$]$_b$——(S)$_c$——[M]$_d$ wherein R contains at least 1 nitrogen atom, 1 sulfur atom, and 3 carbon atoms arranged in a linear, branched, or cyclic configuration, as for example,

 benzothiazyl,

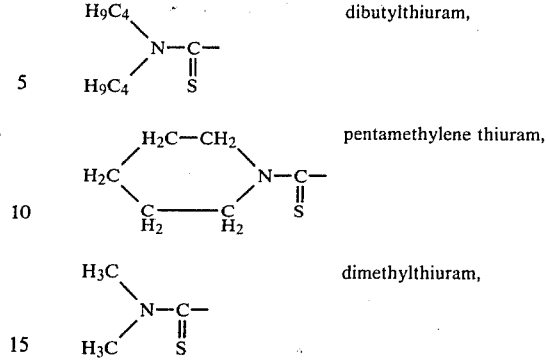

M can be a metal such as zinc, sodium, cadmium, copper, bismuth, lead, selenium, or tellurium; a=0 to 3; b=2, 3, or 4; c=0 or 1; and d=0 or 1. Some examples of typical nitrogen/sulfur-containing accelerators useful in the present invention are shown in Table II.

TABLE II

| Nitrogen/Sulfur-Containing Accelerators | | |
|---|---|---|
| Accelerator | Tradename | Source |
| 1. N,N,N',N'-Tetramethyl Thiuram Disulfide | Methyl Tuads | R. T. Vanderbilt |
| 2. N,N,N',N'-Tetramethyl Thiuram Monosulfide | Aceto TMTM | Aceto Chem. |
| 3. N,N,N',N'-Tetraethyl Thiuram Disulfide | Ethyl Tuex | Uniroyal Chem. |
| 4. Dipentamethylene Thiuram Hexasulfide | Sulfads | R. T. Vanderbilt |
| 5. 2,2'-Benzothiazyl Disulfide | Altax | R. T. Vanderbilt |
| 6. Zinc bis(N,N-Dimethyl Dithiocarbamate) | Aceto ZDED | Aceto Chem. |
| 7. Zinc bis(N,N-Diethyl Dithiocarbamate) | Ethazate 50-D | Uniroyal Chem. |
| 8. Zinc bis(N,N-Dibutyl Dithiocarbamate) | Aceto ZDBD | Aceto Chem. |
| 9. Zinc bis(N,N-Dibenzyl Dithiocarbamate | Arazate | Uniroyal Chem. |
| 10. Sodium N,N-Dibutyl Dithiocarbamate | Butyl Namate | R. T. Vanderbilt |
| 11. Cadmium bis(N,N-Diethyl Dithiocarbamate) | Cadmate | R. T. Vanderbilt |
| 12. Copper bis(N,N-Dimethyl Dithiocarbamate) | Cumate | Uniroyal Chem. |
| 13. Lead bis(N,N-Dimethyl Dithiocarbamate) | Ledate | R. T. Vanderbilt |
| 14. Bismuth tris(N,N-Dimethyl Dithiocarbamate) | Bismate | R. T. Vanderbilt |
| 15. Selenium tetrakis(N,N-Diethyl Dithiocarbamate) | Ethyl Selenac | R. T. Vanderbilt |
| 16. Tellurium tetrakis-(N,N-Diethyl Dithiocarbamate) | Tellurac | R. T. Vanderbilt |

(note: Thiuram sulfide and dithiocarbamate are identical,

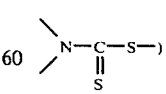

A third type of organonitrogen accelerators useful in this invention are those containing oxygen atoms in addition to sulfur, nitrogen, carbon and hydrogen atoms. All of these elements can exist in one molecule or can exist in a combination of molecules, the sum of which contains all of the essential elements. When all of the essential elements are within one molecule, the molecule is generally symmetrical, such as, for example, 4,4′-dithiodimorpholine (Vanax A, R. T. Vanderbilt). An example of an accelerator where all five essential elements are the result of a combination of two or more molecules is DBA/CPB, a mixture of a blend of dibenzylamine-mono-benzylamine and dibutyl xanthogen disulfide (Uniroyal Chem.).

Other ingredients useful in the basic formulation of the present invention that can improve properties, reduce costs, etc., are left to those skilled in the art. For example, fillers such as calcium carbonate, calcium silicates, calcium sulfates, clays, magnesium carbonates, magnesium oxides, magnesium silicates, mica, titanium dioxide, zinc oxide, zinc sulfide, and the like, and mixtures thereof can be used.

Plasticizers can also be used to soften or extend the formulation. Plasticizers such as chlorinated hydrocarbons, dialkylphthalates, low molecular weight extender oils, and the like, and mixtures thereof are typical examples.

Antioxidants can also be used in the formulation to reduce or inhibit oxidation before or after curing among which are for example, substituted phenols, dialkylthiodiesters, phosphites, and phosphonates.

Thickeners can be employed to prevent the formulation from excessive sag or running before curing. Fumed silica is frequently used in sealant formulations for this purpose although other type thickening agents can be used, such as carboxymethyl cellulose, high molecular weight carboxy vinyl polymers (i.e., Carbopol®), asbestos, polyolefin fibers, and other recognized thixotropic materials. Frequently, hydroxy compounds such as glycols, phenols or water are added to formulations having fumed silicas present to accelerate thickening.

Adhesion promoters can be employed to improve adhesion of the sealant compositions to suitable substrates. Suitable adhesion promoters include organosilanes such as gamma glycidoxypropyltrimethoxysilane and gamma mercaptopropyltrimethoxysilane.

Any formulation having the three basic ingredients of the invention, namely: (1) the mercaptan-terminated polyether-polyester liquid polymer, (2) a non-lead metal oxide or metal carbonate-oxide curing agent, and (3) an organonitrogen accelerator or promoter are within the scope of this invention. However, for most applications involving the present invention, additional ingredients can be added to reduce the cost and in some cases improve performance properties. The amount of poly(oxyalkylene)-polyester-poly(monosulfide)-polythiol present in the sealant or coating formulations containing non-elastomeric components will vary appreciably depending on the desired characteristics of the sealant or coating composition. The amount of curing agent metal oxide and accelerator or promoter present in the coating compositions with or without non-elastomeric components present will be sufficient to effect cure of the polymercaptan-terminated polymer at ambient conditions. A typical caulking composition will contain fillers, plasticizers, curing agents, and accelerators, optionally some stabilizer antioxidants, UV absorbers and colorants. A basic formulation used in the present invention to illustrate operability is shown in Table III along with approximate operating ranges.

TABLE III

| | Basic Sealant Formulation | |
|---|---|---|
| | Weight Percent | |
| Ingredient | Broad | Preferred |
| Mercaptan-Terminated Polymer | 10–90 | 24–55 |
| Plasticizer | 2–25 | 4–20 |
| Fillers | 5–75 | 20–60 |
| Thickener | 1–10 | 2–5 |
| Water | 0–5 | 0.1–2 |
| Pigments | 0–10 | 0.5–5 |
| Antioxidant | 0.05–3 | 0.1–1 |
| Curing Agent | 0.05–5 | 0.1–2 |
| Accelerator | 0.05–5 | 0.1–2 |

The poly(oxyalkylene)-polyester-poly(monosulfide)-polythiol, the metal oxide curing agent, the organonitrogen curing agent accelerator, and any non-elastomeric components employed in the sealant for coating formulations can be blended together simultaneously and suitably agitated, e.g., by hand mixing or machine blending or the metal oxide curing agent and the organonitrogen curing agent accelerator with or without other non-elastomeric components can be added to the poly(oxyalkylene)-polyester-poly(monosulfide)-polythiol previously blended with other components normally used in sealant or coating compositions. The particular technique for blending the ingredients will depend, in part, upon available equipment and the requirements of the sealant or coating application problem.

The sealants and coating of this invention can be employed to join or coat various substrates. For example substrates, such as wood, plastics, glass, stone such as granite, marble, or the like, concrete or metal such as aluminum, steel, iron, zinc, or the like, can be joined or coated.

Although the compositions in the present invention appear to be directed towards sealant type applications, it is understood that other application areas relating to elastomeric products are envisioned, such as, for example, gaskets, coatings, adhesives, rubber modifying ingredients, and the like. The mercaptan-terminated polyether-polyester liquid polymer-based compositions disclosed herein are designed as multi-component (i.e., 2 or more) sealant compositions. However, some of the compositions, particularly those employing thiuram sulfide (dithiocarbamate) accelerators can be used as one-component sealants when correctly compounded by those skilled in the art. For example, it is known (U.S. Pat. No. 3,991,039, column 2, lines 52–56) that similar compositions involving manganese oxide and tetramethyl thiuram disulfide are inactive when the composition is kept free of oxygen.

The following examples describe the preparation of the type polymers useful in the present invention and the operability of the present invention.

EXAMPLE I

Preparation of Poly(oxyalkylene)-Polyester-Poly(monosulfide)-Polythiol

Into a one gallon stainless steel reactor fitted with a stirrer, pressure gauge, temperature measuring device and internal cooling coil was placed methanol (600 ml), concentrated ammonium hydroxide (28 wt. % $NH_3$, 21.6 gm), sulfur (12 gm) and hydrogen sulfide (816 gm). Methyl acrylate (1376 gm) was introduced into the stirred reactor over a 45 minute interval. During the reaction period the temperature of the reaction mixture increased from 23° C. to 53° C. while the pressure decreased from 1.65 MPa to 1.15 MPa (1 megapascal=145.03 pounds/sq. in.). After an additional 30 minute period of stirring, the reactor was vented to release excess hydrogen sulfide and the remaining reaction solution was transferred to a fractionation apparatus. A total of 5 runs were made as described above. The resulting reaction mixtures were combined prior to fractional distillation.

A fraction (5889 gm) was collected over a boiling range of 87°-93° C. at 0.0066 MPa (50 mm) pressure which contained 98.6 wt. % methyl mercaptopropionate (analyzed by GLC, i.e., gas-liquid chromatography). The undistilled pot residue (3005 gm) contained 85 wt. % dimethylthiodipropionate and 15 wt. % dimethyl dithiodipropionate (analyzed by GLC).

Into a 3 liter, stirred, heated glass reactor was added polyether polyol (550 gm of LHT-34 from Union Carbide-derived from 1,2,6-hexanetriol and propylene oxide, having a molecular weight of about 4500 and a hydroxyl number of about 34). Nitrogen (0.056 m³/hr) was bubbled through the stirred reactor contents maintained at 100° C. for one hour to remove residual water. The nitrogen flow was then reduced to 0.0056 m³/hr, a reflux condenser was attached and methyl mercaptopropionate (25.9 gm fraction described above), sulfide-disulfide mixture (14.1 gm-undistilled pot residue described above) and tetrabutyl titanate (0.2 ml, Du Pont's Tyzor TBT) were added to the reactor. The stirred reaction mixture was maintained at 177° C. for 24 hours. The nitrogen flow through the reaction mixture swept out the by-product methanol as formed in the transesterification reaction. At the end of the 24 hour period, the reflux condenser was removed and the nitrogen flow rate was increased to 0.056 m³/hr with the temperature maintained at 177° C. for one hour to remove volatiles. The resultant poly(oxyalkylene)-polyester-poly(monosulfide)-polythiol possessed 0.88 wt. % mercaptan sulfur and a viscosity of 6800 centipoise at 25° C. This polymer is herein referred to as polyether-polyester mercaptan-terminated polymer.

EXAMPLE II

The following example illustrates the operability of the present invention.

A sealant formulation pre-mix was prepared using the following recipe and employing the polymer described in Example I.

| Sealant Formulation Recipe | | |
|---|---|---|
| Ingredients | grams | wt. % |
| Polymer (from Example I) | 2400 | 53.80 |
| Plasticizer, chlorinated Paraffin[1] | 360 | 8.07 |
| Fillers, Calcium Carbonate[2] | 1200 | 26.89 |
| Titanium Dioxide | 240 | 5.38 |
| Thickener, Fumed Silica | 144 | 3.23 |
| Antioxidant[3] | 24 | 0.54 |
| Pigments, Carbon Black[4] | 14.4 | 0.32 |
| Cadmium Yellow[5] | 18 | 0.40 |
| Iron Oxide[6] | 61.2 | 1.37 |
| | 4461.6 | 100.00 |

[1]Clorafin 50 from Monsanto, a light yellow, viscous liquid.
[2]Supermultiflex, Diamond Shamrock.
[3]2,2'-Methylenebis(4-methyl-6-t-butylphenol).
[4]Neutral black, N765, Phillips Petroleum Co.
[5]Yellow 1476, Harshaw Chem. Co.
[6]R-2199, Pfizer Minerals.

To 18.6 gms of the above sealant pre-mix was added 0.6 gms of a manganese dioxide paste (35 wt. % MnO₂ in HB-40 vehicle from G. P. Roeser, Inc.) and 0.2 grams of 2,2'-benzothiazyl disulfide (Altax, R. T. Vanderbilt) and handmixed for about 5 minutes at ambient room temperature after which a portion of the new mix was placed in a 6.35 cm (2.5 in.)×6.35 cm (2.5 in.)×0.32 cm (0.125 in.) picture-frame mold and allowed to cure at ambient room temperature for 14 days. The cured specimen was then removed and bulk properties determined. The procedure was repeated except various other accelerators were employed instead of the 2,2'-benzothiazyl disulfide. Two controls were also run, namely one with the manganese oxide catalyst without an accelerator and another with lead dioxide catalyst without an accelerator. These results are listed in Table IV where it is shown that the lead dioxide catalyst-based composition does not require an accelerator for a satisfactory cured whereas the manganese dioxide catalyst-based composition requires an accelerator. It is also shown that the cured performance properties of the MnO₂/accelerator systems are equal to those of the lead dioxide cured system. An additional feature of using 2,2'-benzothiazyl disulfide is that the cured elastomeric sealant composition cures faster than the lead cured system and does not have a tacky surface after cure, an important aspect for minimal dust pick-up requirements. The results tend to indicate that symmetrical molecules are better accelerators than unsymmetrical molecules, although only one unsymmetrical accelerator compound (Table IV, No. 8) was tested.

TABLE IV

Effect of Various Accelerators on the MnO₂ Cured Properties of Mercaptan-Terminated Polymer-Based Compositions

| Accelerator | 50% Modulus[a] MPa | psi | Tensile Strength[a] MPa | psi | % Elongation[a] | Tack,[b] Time,Hrs | Surface Condition |
|---|---|---|---|---|---|---|---|
| A. Lead Dioxide Curing Agent[c]: | | | | | | | |
| 1. No accelerator | 0.26 | 38.3 | 1.12 | 163 | >700 | <72 | Tacky |
| B. Manganese Dioxide Curing Agent[d]: | | | | | | | |
| 1. No accelerator | | | | | Incomplete Cure | | |
| 2. 2,2'-Benzothiazyl disulfide | 0.24 | 35.5 | 1.29 | 188 | >700 | <24 | Non-Tacky |
| 3. Butyraldehyde-Butylidene-Anilene product | 0.14 | 20.0 | 0.73 | 106.5 | >700 | <72 | Very Tacky |
| 4. Dipentamethylene Hexasulfide | 0.26 | 38 | 0.97 | 140.5 | 570 | <24 | Tacky |
| 5. Zinc bis(N,N-Dibutyl Dithiocarbamate) | 0.31 | 44.5 | 1.68 | 243 | >700 | <24 | Tacky |
| 6. DBA/CPB[e] | 0.23 | 33 | 1.05 | 152 | 665 | <72 | Slight Tack |
| 7. N,N,N',N'-Tetramethyl | 0.23 | 33.5 | 1.05 | 152 | >700 | <24 | Very Tacky |

TABLE IV-continued

Effect of Various Accelerators on the MnO$_2$ Cured
Properties of Mercaptan-Terminated Polymer-Based Compositions

| Accelerator | 50% Modulus[a] MPa | psi | Tensile Strength[a] MPa | psi | % Elongation[a] | Tack,[b] Time,Hrs | Surface Condition |
|---|---|---|---|---|---|---|---|
| Thiuram Disulfide | | | | | | | |
| 8. 4-Morpholinyl-2-Benzothiazole Disulfide | | | Incomplete Cure | | | | |

[a]ASTM D-888-56T
[b]Federal Specification Test TT-S-227e for multi-component elastomeric sealant. Requirement is no sealant transfer to a polyethylene film after 72 hours at about 25° C.
[c]50 Wt. % PbO$_2$ from G. P. Roeser, Inc.
[d]35 Wt. % MnO$_2$ from G. P. Roeser, Inc.
[e]Dibenzylamine-monobenzylamine blend/dibutyl xanthogen disulfide.

EXAMPLE III

The sealant preparation, cure, and testing as described in Example II was repeated except 0.5 grams of calcium peroxide (CaO$_2$, paste—40 wt. %) was substituted for 0.6 grams of MnO$_2$. The results listed in Table V show several accelerators tested. Best results obtained that were comparable to the lead dioxide curing agent control system were with 2,2'-benzothiazyl disulfide (Table V, No. 2) and DBA/CPB (Table V, No. 6). The CaO$_2$-based system required an accelerator to cure.

EXAMPLE IV

The sealant preparation, cure, and testing as described in Example II was again repeated except 0.5 grams of zinc peroxide (50 wt. % ZnO$_2$ in a paste) was substituted for 0.6 grams of MnO$_2$. The results listed in Table VI show the selectivity of the various accelerators with ZnO$_2$. Less than half of the accelerators tested possessed enough activity to provide a cured elastomer and most of those exhibited very tacky surfaces and low tensile strengths.

TABLE V

Effect of Various Accelerators on the CaO$_2$ Cured
Properties of Mercaptan-Terminated Polymer-Based Compositions

| Accelerator | 50% Modulus MPa | psi | Tensile Strength MPa | psi | % Elongation | Tack Time,Hrs | Surface Condition |
|---|---|---|---|---|---|---|---|
| A. Lead Dioxide Curing Agent[a] | | | | | | | |
| 1. No accelerator | 0.26 | 38.3 | 1.12 | 163 | >700 | <72 | Tacky |
| B. Calcium Peroxide Curing Agent[b] | | | | | | | |
| 1. No accelerator | | | Incomplete Cure | | | | |
| 2. 2,2'-Benzothiazyl Disulfide | 0.30 | 43.5 | 1.25 | 181.5 | >700 | <72 | Tacky |
| 3. Butyraldehyde-Butylidene-Aniline Reaction | | | | | No Cure | | |
| 4. Dipentamethylene | 0.11 | 16.5 | 0.28 | 41 | 407 | <24 | Slight |
| 5. Zinc bis(N,N-Dibutyl Dithiocarbamate) | | | | | No Cure | | |
| 6. DBA/CPB | 0.23 | 34 | 1.19 | 173 | >700 | <72 | Tacky |
| 7. N,N,N',N'-Tetramethyl Thiuram Disulfide | | | Incomplete Cure | | | | |
| 8. 4-Morpholenyl-2-Benzothiazole Disulfide | | | Incomplete Cure | | | | |

[a]50 Wt. % PbO$_2$ from G. P. Roeser, Inc.
[b]40 Wt. % CaO$_2$ from G. P. Roeser, Inc.

TABLE VI

Effect of Various Accelerators on the ZnO$_2$ Cured
Properties of Mercaptan-Terminated Polymer-Based Compositions

| Accelerator | 50% Modulus MPa | psi | Tensile Strength MPa | psi | % Elongation | Tack Time,hrs. | Surface Condition |
|---|---|---|---|---|---|---|---|
| A. Lead Dioxide Curing Agent | | | | | | | |
| 1. No accelerator | 0.26 | 38.3 | 1.12 | 163 | >700 | <72 | Tacky |
| B. Zinc Peroxide Curing Agent[a] | | | | | | | |
| 1. No accelerator | | | | | Incomplete Cure | | |
| 2. 2,2'-Benzothiazyl | | | | | Incomplete Cure | | |
| 3. Butyraldehyde-Butylidene-Aniline Reaction | 0.20 | 29.5 | 0.21 | 31 | 72 | <22 | Very Tacky |
| 4. Dipentamethylene Hexasulfide | 0.23 | 34 | 0.86 | 127 | 670 | <72 | Slight Tack |
| 5. Zinc bis(N,N-Dibutyl Dithiocarbamate) | | | | | Incomplete Cure | | |
| 6. DBA/CPB | | | | | Incomplete Cure | | |

TABLE VI-continued

Effect of Various Accelerators on the ZnO₂ Cured
Properties of Mercaptan-Terminated Polymer-Based Compositions

| Accelerator | 50% Modulus MPa | 50% Modulus psi | Tensile Strength MPa | Tensile Strength psi | % Elongation | Tack Time,hrs. | Surface Condition |
|---|---|---|---|---|---|---|---|
| 7. N,N,N',N'-Tetramethyl Thiuram Disulfide | 0.29 | 42.5 | 1.09 | 159 | 475 | <72 | Very Tacky |

[a] 50 Wt. % ZnO₂ from G. P. Roeser, Inc.

EXAMPLE V

The sealant preparation, cure, and testing as described in Example II was again repeated except 1.4 grams of a blend of zinc carbonate/zinc oxide known as basic zinc carbonate (ZnCO₃·2ZnO) was used instead of 0.6 grams MnO₂. The results are listed in Table VII and generally show good modulus and tensile strength properties but somewhat lower elongation. The surface condition after cure indicates very little tack which is desirous for low dirt pick-up. This zinc-based catalyst appears to be more active than the zinc peroxide catalyst as evidenced by the higher strength values and by the number of accelerators tested that are capable of providing a cure.

TABLE VII

Effect of Various Accelerators on the ZnCO₃·2ZnO Cured
Properties of Mercaptan-Terminated Polymer-Based Compositions

| Accelerator | 50% Modulus MPa | 50% Modulus psi | Tensile Strength MPa | Tensile Strength psi | % Elongation | Tack Time,Hrs | Surface Condition |
|---|---|---|---|---|---|---|---|
| A. Lead Dioxide Curing Agent | | | | | | | |
| 1. No accelerator | 0.26 | 38.3 | 1.12 | 163 | >700 | <72 | Tacky |
| B. Zinc Carbonate . Zinc Oxide[a] Curing Agent | | | | | | | |
| 1. No accelerator | | | | | Incomplete Cure | | |
| 2. 2,2'-Benzothiazyl Disulfide | 0.13 | 18.5 | 0.49 | 71 | 587 | <24 | Slight Tack |
| 3. Butyraldehyde-Butyl- | 0.19 | 27 | 0.37 | 53 | 155 | <72 | — |
| 4. Dipentamethylene Hexasulfide | 0.36 | 52 | 0.83 | 121 | 300 | <72 | Slight Tack |
| 5. Zinc bis(N,N-Dibutyl Dithiocarbamate) | | | | | Incomplete Cure | | |
| 6. DBA/CPB | 0.36 | 52 | 0.94 | 137 | 340 | <24 | Slight Tack |
| 7. N,N,N'-Tetramethyl Thiuram Disulfide | 0.31 | 44.5 | 0.89 | 129.5 | 430 | <24 | Slight Tack |

[a] 100% Solids

EXAMPLE VI

Another mercaptan-terminated polyether-polyester liquid polymer-based composition was prepared but at a lower polymer level and cured with MnO₂ to determine bulk properties and adhesions to unprimed glass surfaces. The composition used is shown in the following recipe:

| Sealant Formulation Recipe | | |
|---|---|---|
| Ingredients | grams | Wt. % |
| Polymer (from Example I) | 29.40 | 29.94 |
| Plasticizer, Chlorinated Paraffin | 4.05 | 4.12 |
| Fillers, Calcium Carbonate[1] | 41.81 | 42.58 |
| Titanium Dioxide | 19.96 | 20.33 |
| Thickener, Fumed Silica | 2.70 | 2.75 |
| Antioxidant[2] | 0.27 | 0.28 |
| | 98.19 | 100.00 |

[1] Hi Flex 100 from Pfizer Minerals
[2] 2,2'-Methylenebis(4-methyl-6-t-butylphenol)

To 45 grams of the above sealant pre-mix was added 4.5 grams of a MnO₂ paste (35 wt. % MnO₂ in HB-40 vehicle from G. P. Roeser, Inc.) and 1.5 grams of accelerator and the composition treated in like manner as described in Example II to determine bulk properties. In addition, lap shear strength values were obtained on the compositions containing the various accelerators. Clean unprimed glass specimens, 2.54 cm (1.0 in.)×7.62 cm (3.0 in.)×0.64 cm (0.25 in.) were treated at one end of the flat surface with the sealant composition comprised of curing agent and accelerator before curing started and arranged in such a manner so as to have a 1.27 cm (0.5 in.) overlap. A slight pressure was applied and the test specimen held rigid for 24 hours after which the sample was tested on an Instron Tester (Model TT) at a cross head speed of 0.05 in/min. These results are listed in Table VIII and show that good tensile strength and adhesion to glass is obtained in 24 hours or less. This fast cure, high strength sealant can be useful in assembly-line in-plant production articles such as in the insulated glass industry. In addition, it can be seen that adding small amounts of substituted organosilanes greatly increase the adhesion to glass.

TABLE VIII

Effect of Organosilanes on the Adhesive Lap Shear Strength of Mercaptan-Terminated Polymer-Based Sealant Containing Various Accelerators

| Run No. | 1 | 2 | 3 | 4 | 5 | 6 |
|---|---|---|---|---|---|---|
| A. Sealant Premix, gms | 45 | 45 | 45 | 45 | 45 | 45 |
| B. $MnO_2$ (35 wt. %), gms | 4.5 | 4.5 | 4.5 | 4.5 | 4.5 | 4.5 |
| C. Accelerator: gms | | | | | | |
| 1. Zinc bis(N,N-Dibutyl Dithiocarbamate) | 1.5 | 1.5 | 1.5 | — | — | — |
| 2. 2,2'-Dibenzothiazyl Disulfide | — | — | — | 1.5 | — | — |
| 3. Dipentamethylene Thiuram Disulfide | — | — | — | — | 1.5 | — |
| 4. N,N,N',N'-Tetramethyl Thiuram Disulfide | — | — | — | — | — | 1.5 |
| D. Adhesive Promoters, gms | | | | | | |
| 1. A-187* | — | 0.3 | — | — | — | — |
| 2. A-189** | — | — | 0.3 | — | — | — |
| E. Performance Properties | | | | | | |
| 1. 50% Modulus, MPa(psi) | | | | | | |
| After 4 hrs. | 0.33(48) | — | — | 0.17(24) | 0.32(46) | *** |
| After 24 hrs. | 0.34(50) | — | — | 0.19(28) | 0.34(50) | *** |
| 2. Tensile Strength, MPa (psi) | | | | | | |
| After 4 hrs. | 1.05(152) | — | — | 0.52(75) | 0.63(92) | *** |
| After 24 hrs. | 0.97(140) | — | — | 0.60(87) | 0.61(88) | *** |
| 3. % Elongation | | | | | | |
| After 4 hours | 4.40(638) | — | — | 4.38(635) | 3.12(453) | *** |
| After 24 hours | 4.14(600) | — | — | 4.22(612) | 2.70(392) | *** |
| 4. Lap Shear on Glass, MPa (psi) | | | | | | |
| After 4 hrs. | — | 0.64(92.5) | 0.31(45) | — | — | *** |
| After 24 hrs. | 0.25(36.5) | 0.56(81) | 0.39(56.5) | 0.07(10) | 0.12(392) | *** |

*Gamma glycidoxypropyltrimethoxysilane
**Gamma mercaptopropyltrimethoxysilane
***No cure

SUMMARY

Mercaptan-terminated polyether-polyester liquid polymer-based compositions treated with a non-lead metal oxide or metal oxide/metal crbonate curing agents require certain type accelerators to promote a cure to an elastomeric product with performance properties comparable to those obtained with the heretofore more commonly used but now environmentally undesirable lead dioxide curing agent. The class of accelerators that promote such a cure and are claimed in the present invention as organonitrogen compounds of three types: (1) aldehyde-amine reaction products, (2) symmetrical organonitrogen sulfides and polysulfides, and (3) mixtures of amines and dithioester(xanthate) sulfides. Manganese dioxide is the more desirable of the metal oxides evaluated because it is active with more accelerators, however, calcium peroxide, zinc peroxide, and zinc carbonate/zinc oxide curing agents are also useful in the present invention. The addition of organosilanes to the compositions result in elastomeric products with increased adhesion to glass.

A summary of the results disclosed herein is given in Table IX.

TABLE IX

15/25 Summary Table

| | | Performance Properties | | | |
|---|---|---|---|---|---|
| | | 50% Modulus | | | |
| Curing Agent | Accelerator | MPa | psi | Time,Hr. | Condition |
| 1. $PBO_2$ | none | 0.26 | 38.3 | <72 | Tacky |
| 2. $MnO_2$ | none | | | no cure | |
| 3. $MnO_2$ | Aldehyde-Amine Product[a] | 0.14 | 20 | <72 | Very Tacky |
| 4. $MnO_2$ | Symmetrical Organonitrogen Sulfides[b] | 0.24 | 35.5 | <24 | Non-Tacky |
| 5. $MnO_2$ | Amines-Thioester Sulfide Blends[c] | 0.23 | 33 | <72 | Slight Tack |
| 6. $MnO_2$ | Unsymmetrical Organoamino Sulfides[d] | | | no cure | |

[a]Butyraldehyde-Butylidene-Aniline reaction product
[b]2,2'-Dibenzothiazyl Disulfide
[c]Dibenzylamine-monobenzylamine blend and Dibutyl Xanthogen Disulfide (DBA/CPB)
[d]4-Morpholinyl-2-Benzothiazole Disulfide

I claim:

1. Curable sealing and coating compositions comprising
   (a) a mercaptan-terminated polyether-polyester polymer having an average of more than two mercapto groups per molecule prepared by reacting a poly(oxyalkylene) polyol with a mixture of at least one mercaptoalkanoic acid and at least one thiodialkanoic acid or with a mixture of at least one alkyl mercaptocarboxylate and at least one dialkyl thiodicarboxylate;
   (b) at least one non-lead metal oxide curing agent selected from the group consisting of metal oxides within Groups II and VII of the Periodic Table, and
(c) at least one organonitrogen rubber vulcanization accelerator selected from the group consisting of
(1) compounds derived from an aldehyde and an amine
(2) organonitrogen compounds having sulfur represented by the formula

wherein R contains at least 1 nitrogen atom, 1 sulfur atom, and 3 carbon atoms arranged in a linear, branched, or cyclic configuration, M is a metal, a is 0 to 3, b is 2, 3 or 4, c is 0 or 1 and d is 0 or 1, and
(3) compounds having nitrogen, sulfur, oxygen, carbon and hydrogen atoms which can exist in one molecular or a combination of molecules. the amount of (b) and (c) present being sufficient to effect cure under ambient conditions.

2. A composition according to claim 1 which additionally contains
(d) nonelastomeric components selected from fillers, plasticizers, antioxidants and adhesion promoters.

3. A composition according to claim 1 wherein, based on total composition, the amount of each of (b) and (c) ranges from about 0.05 to about 5 weight percent.

4. A composition according to claim 1 wherein (b) is a metal oxide selected from the group consisting of manganese dioxide, calcium peroxide, zinc peroxide, and basic zinc carbonate.

5. A composition according to claim 1 wherein (c) is selected from a group consisting of 2,2'-benzothiazyl disulfide, butyraldehyde-butylidene-aniline product, dipentamethylene hexasulfide, N,N,N',N'-tetramethyl thiuram disulfide, zinc bis(N,N-dibutyl dithiocarbamate) and dibenzylamine-monobenzylamine blend/dibutyl xanthogen disulfide.

6. A composition according to claim 1 wherein (b) is a metal oxide selected from the group consisting of manganese dioxide, calcium peroxide, zinc peroxide, and basic zinc carbonate, (c) is selected from a group consisting of 2,2'-benzothiazyl disulfide, butyraldehyde-butylideneaniline product, dipentamethylene hexasulfide, N,N,N',N'-tetramethyl thiuram disulfide, zinc bis(N,N-dibutyl dithiocarbamate) and dibenzylamine-monobenzylamine blend/dibutyl xanthogen disulfide and which additionally contains (d) non-elastomeric components selected from fillers, plasticizers, antioxidants and adhesion promoters.

7. A composition according to claim 6 wherein the amount of each of (b) and (c) ranges from about 0.1 to about 2 weight percent.

8. A composition according to claim 1 wherein (b) is manganese dioxide, calcium peroxide, zinc peroxide or basic zinc carbonate and (c) is dipentamethylene hexasulfide.

9. A composition according to claim 6 wherein (b) is manganese dioxide and (c) is 2,2'-benzothiazyl disulfide, butyraldehyde-butylidene-aniline product, dipentamethylene hexasulfide, N,N,N',N'-tetramethyl thiuram disulfide, zinc bis(N,N-dibutyl dithiocarbamate) or dibenzyl-monobenzylamine blend/dibutyl xanthogen disulfide.

10. A composition according to claim 6 wherein (b) is basic zinc carbonate and (c) is 2,2'-benzothiazyl disulfide, butyraldehyde-butylidene-aniline product, dipentamethylene hexasulfide, N,N,N',N'-tetramethyl thiuram disulfide, zinc bis(N,N-dibutyl dithiocarbamate) or dibenzylamine-monobenzylamine blend/dibutyl xanthogen disulfide.

11. As an article of manufacture, a substrate coated on at least one surface thereof with a composition of claim 1.

12. An article according to claim 11 wherein the composition additionally contains (d) non-elastomeric components selected from fillers, plasticizers, antioxidants and adhesion promoters.

13. An article according to claim 11 wherein the amounts of each of (b) and (c) ranges from about 0.05 to about 5 weight percent of the total composition.

14. An article according to claim 12 wherein the substrate is glass.

15. A process for the production of polythiol sealant and coating compositions according to claim 1 curable at ambient temperatures which comprises
(1) admixing a mercaptan-terminated polyether-polyester polymer with a metal oxide (b) and an accelerator (c) in an amount of (b) and (c) sufficient to effect cure of (a) at ambient conditions, and
(2) subjecting the mixture of step (1) to ambient temperatures for a period of time sufficient to effect cure of said polythiol.

16. A process according to claim 15 which further comprises the step of adding to said admixture at least one non-elastomeric component (d) selected from fillers, plasticizers, antioxidants and adhesion promoters.

17. A process according to claim 15 wherein the amounts of each of (b) and (c) ranges from about 0.05 to about 5 weight percent based on total composition.

18. A process according to claim 15 wherein (b) is a metal oxide selected from the group consisting of manganese dioxide, calcium peroxide, zinc peroxide, and basic zinc carbonate and (c) is selected from a group consisting of 2,2'-benzothiazyl disulfide, butyraldehyde-butylideneaniline product, dipentamethylene hexasulfide, N,N,N',N'-tetramethyl thiuram disulfide, zinc bis(N,N-dibutyl dithiocarbamate) and dibenzylamine-monobenzyl-amine blend/dibutyl xanthogen disulfide.

* * * * *